Figure 3:
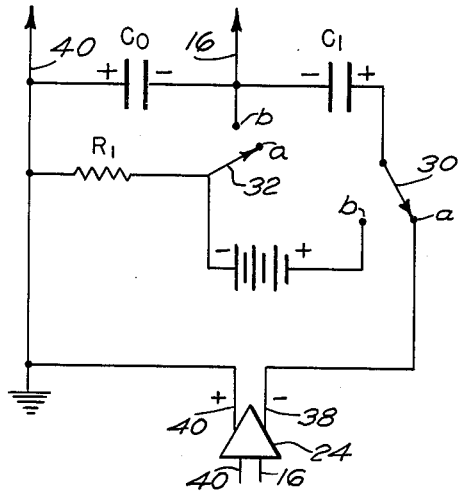

May 14, 1963 D. F. COMSTOCK, JR 3,089,332
ABSOLUTE VIBRATION MEASURING INSTRUMENT
Filed Nov. 18, 1959 2 Sheets-Sheet 1
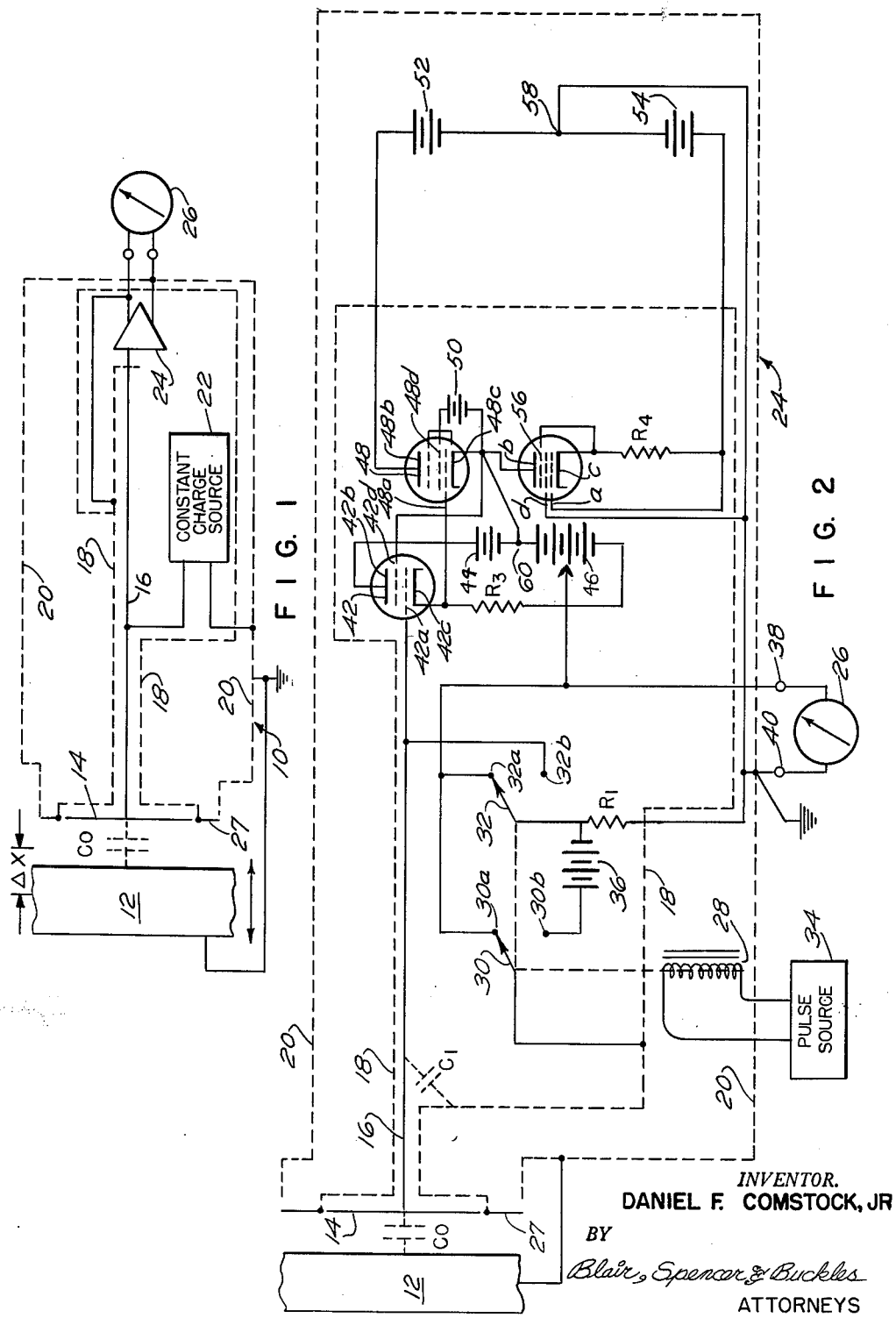
INVENTOR.
DANIEL F. COMSTOCK, JR
BY
Blair, Spencer & Buckles
ATTORNEYS

ABSOLUTE VIBRATION MEASURING INSTRUMENT

Daniel F. Comstock, Jr., Cohasset, Mass., assignor to Arthur D. Little, Inc., Cambridge, Mass.
Filed Nov. 18, 1959, Ser. No. 853,789
11 Claims. (Cl. 73—71.4)

This invention relates to an improved vibration measuring instrument adapted to measure the amplitude of the vibrations of a vibrating object. The instrument measures the variations in capacitance between the object and a probe as the object vibrates back and forth. More specifically, in accordance with our invention, the probe is provided with a fixed electrical charge, and stray capacitance between the probe and the vibrating object is eliminated. This provides an accurate indication of the vibrational amplitude regardless of variations in the distance between the probe and the object.

A well-known method of measuring the amplitude of the vibrations of an electrically conductive object is to measure the capacitance between the vibrating object and a stationary probe. As the object vibrates, the capacitance increases and decreases. The output voltage of the instrument undergoes corresponding excursions and thus contains an alternating current component. The amplitude of this alternating current signal is proportional to the amplitude of vibration. A particular advantage of an instrument of this type is that it does not require any direct connections to the vibrating object which might change the characteristics of the vibrations and thereby cause substantial inaccuracies in the measurements.

Prior to my invention, a widely used vibration measuring instrument has been one which charges the capacitor comprising the probe and the vibrating object to a predetermined voltage. The voltage across this capacitor then varies according to changes in the spacing between the probe and object and thus goes up and down as the object vibrates. The magnitude of the voltage variation is a function of the amplitude of the variation in capacitance. A serious drawback of an instrument of this type is the dependence of the alternating output voltage not only on the amplitude of vibration but also on the average spacing between the probe and the object, i.e., the distance between the probe and the object when the latter is not vibrating. Thus, the distance between the probe and the object must be known with considerable accuracy in order to properly calibrate the instrument if accurate measurements of the vibrational amplitude are desired. This makes it difficult to take rapid vibration readings, and it virtually rules out hand-holding of the probe which must be clamped in place in order to prevent variation of its mean distance from the vibrating object.

Accordingly, it is a principal object of my invention to provide an improved vibration measuring instrument of the capacitance type adapted for accurate measurement of the amplitude of vibration of a vibrating object.

It is another object of the invention to provide an instrument of the above character which provides an amplitude reading substantially independent of the spacing between the probe and the vibrating object and therefore may be hand-held without accurately locating the instrument with respect to the vibrating object.

A still further object of the invention is to provide an instrument of the above character capable of accurate measurement of small capacitances.

Another object of my invention is to provide a vibration measuring instrument of the above type requiring a minimum of adjustments and therefore adapted for use by relatively unskilled personnel.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

Figure 4:
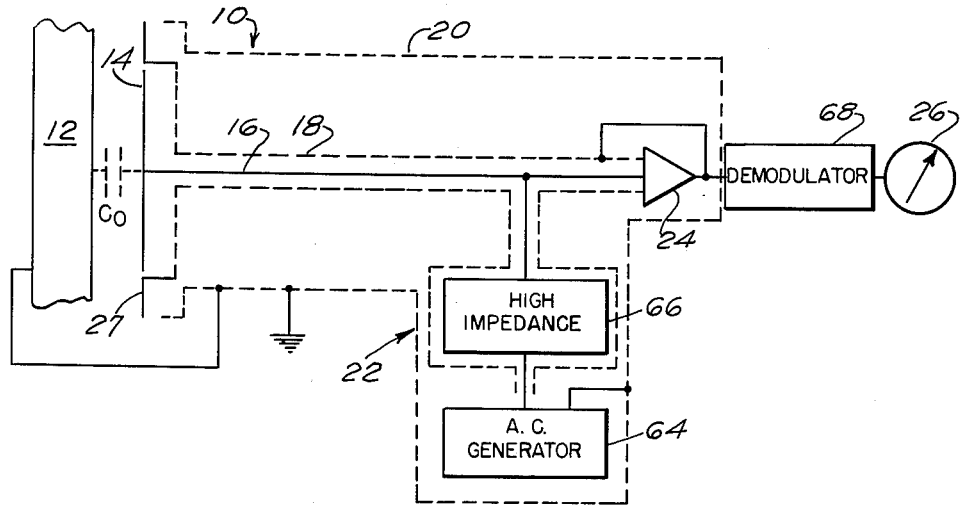

For a fuller understanding of the nature and objects of the invention, reference should be had to the following detailed description, taken in connection with the accompanying drawings, in which:

FIGURE 1 is a simplified schematic block diagram of a vibration measuring instrument embodying the principles of my invention, FIGURE 2 is a detailed schematic diagram of a direct-current version of the instrument of FIGURE 1, FIGURE 3 is a schematic diagram showing the manner in which the probe of FIGURE 2 is supplied with a fixed charge, and FIGURE 4 is a schematic diagram of the alternating-current version of the instrument of FIGURE 1.

My invention makes use of a constant charge on the probe-vibrating object capacitor rather than a constant voltage. That is, the instrument charges the capacitor to a level which is independent of the value of the capacitance and therefore independent also of the distance between the probe and the object. Furthermore, stray capacitance between the probe and the object, e.g., by way of the probe lead and ground, is eliminated, so that the only capacitance present is a function of the vibrations to be measured. As shown below, the combination of these two features provides an output signal from the instrument which is substantially independent of the spacing of the probe from the vibrating object, and therefore accurate measurements may be made without clamping the probe at an accurately predetermined position.

The principles of my invention will be understood by reference to FIGURE 1 in which a probe generally indicated at 10 is positioned to measure the vibrations of a vibrating object 12. The probe 10 includes a capacitance plate 14 and a lead 16 surrounded by an inner shield 18 and an outer shield 20, the latter being connected to the object 12 by a ground connection. A constant charge source generally indicated at 22 is connected between the lead 16 and the outer shield 20. The source 22 thus supplies a charge to the capacitor $C_o$ comprising the plate 14 and the object 12. The input of a unity gain voltage amplifier 24 is also connected across the capacitor $C_o$, and a meter 26 connected to the output of the amplifier 24 thus indicates the voltage across the capacitor. The output of the amplifier 24 is also connected to the inner shield 18 to maintain it at the same voltage with respect to the grounded outer shield 20 as the lead 16 and plate 14. Thus, there is no electric field between the shield 18 and the portions of the probe enclosed therein, and as a result, the stray capacitance between the object 12 and the probe members 14 and 16 by way of ground or any other conducting medium is eliminated. Thus, the only capacitance is the capacitance $C_o$ directly between the plate 14 and the object 12.

A guard ring 27 in the plane of the plate 14 is connected to the inner shield 18 and thus is maintained at the potential of the plate. The ring 27 largely eliminates the fringe field between the plate 14 and object 12 so that the latter members form an ideal parallel plate capacitor.

Still referring to FIGURE 1, the relationship between the distance between the plate 14 and the vibrating object 12 and the voltage across the capacitor $C_o$ (equal to the voltage V at the output of the unity gain amplifier 24) may be derived as follows:

$$q = CV = (C_o + C_g)V \tag{1}$$

where,

C is the total capacitance between the object 12 and the plate 14 and lead 16, q is the charge on this capacitance, $C_o$ is the capacitance which varies in response to the vibrations to be measured and in FIGURE 1 results from the direct field between the plate 14 and the object 12, and $C_g$ is the leakage capacitance through other paths between the plate 14 and the object 12, i.e., the stray capacitance.

Furthermore, since the object 12 and the plate 14 form an ideal parallel plate capacitor, as provided by the guard ring 27, $$C_o = \frac{kA}{x} \qquad (2)$$

where, x is the spacing between the plate 14 and the object 12,
A is the area of the plate 14, and
k is a constant.

Therefore, by combining with Equation 1, $$q = \frac{kA}{x}V + C_g V \qquad (3)$$

and by rearranging terms, $$\frac{V}{x} = \frac{q - C_g V}{kA} \qquad (4)$$

By means of the unity voltage feedback to the shield 18, $C_g$ is made equal to 0, and the constant charge source 22 maintains a charge on the capacitor $C_o$ which is independent of V and x. Therefore, $$\frac{V}{x}$$

is a constant, independent of x. In other words, neglecting fringing effects, which is permissible as long as the lateral dimensions of the object 12 and opposed portions of the probe 10 are large compared to the distance x, there is a straight line relationship between V and x, so that for every increment in x, there is a proportional change in V regardless of the spacing between the plate 14 and the object 12. Accordingly, $$\Delta V = \frac{q}{kA} \Delta x \qquad (5)$$

Assuming a sinusoidal motion of the object 12, $$\Delta x = M \cos(\omega t) \qquad (6)$$

where M is the amplitude of the vibration.

Thus, $$\Delta V = \frac{Mq}{kA} \cos \omega t \qquad (7)$$

Thus, ΔV takes the form of a sinusoidal variation about the voltage V, and the amplitude of the alternating component is proportional to the amplitude of the vibrations of the object 12. If the meter 26 is made responsive solely to alternating current signals, as may be done by conventional techniques, it may be calibrated directly in terms of the amplitude of vibration M. It should be noted that sinusoidal motion of the object 12 is not required for operation of the instrument of FIGURE 1. If the meter 26 is a peak-reading voltmeter, its reading will be proportional to M regardless of the wave form of the motion of the object.

In FIGURE 2, I have illustrated a vibration measuring probe using a direct-current constant charge source. A relay coil 28 operates a pair of switch arms 30 and 32 between contacts 30a and 30b and 32a and 32b. The coil 28 is energized from a pulse source 34 whose output consists of periodic square pulses. For example, the source 34 may take the form of an asymmetrical free-running multivibrator. A battery 36 is connected between the arm 32 and the contact 30b. The arm 30 is connected to the shield 18. The contacts 30a and 32a are both connected to an output terminal 38 of the unity gain amplifier 24 having the same polarity as the voltage on the lead 16. The other output terminal, indicated at 40, is connected to the shield 20. A resistor R1 is connected between the relay arm 32 and ground (the shield 20).

The unity gain amplifier 24 has as an input stage an electrometer tube 42 connected as a cathode follower. The control grid 42a of this tube is connected to the lead 16, and the plate 42b and cathode 42c are connected in series with a cathode resistor R3 and a pair of batteries 44 and 46. The screen grid 42d of the tube 42 is directly connected to the cathode 48c of a pentode 48. The output of the tube 42 at its cathode 42c is directly connected to the control grid 48a of the tube 48, and the screen grid 48d of the latter tube is maintained at a fixed potential with respect to the cathode 48c by a battery 50. The plate 48b and cathode 48c are connected in series with a pair of batteries 52 and 54 and the plate-cathode conduction of a pentode 56. The junction 58 between the batteries 52 and 54 is grounded to the shield 20 as is the screen grid 56d of the tube 56. The control grid 56a of this tube is connected to the battery 54, and bias is supplied by a cathode resistor R4 connected between the cathode 56c and the latter battery. The output signal from the amplifier 24 is obtained from the cathode 48c, which is connected to the junction 60 between the batteries 44 and 46. As shown in FIGURE 2, the output terminal 38 is tapped off the battery 46 to provide a direct voltage offset. The tap is set to provide a potential of zero volts with respect to ground at the terminal 38 when the grid 42a is grounded.

Operation of the unity gain amplifier 24 of FIGURE 2 will best be understood by keeping in mind certain characteristics of pentode tubes. Assuming that the plate-to-cathode potential of a pentode is sufficiently great, the ratio of screen current to plate current is essentially independent of electrode voltages and the total space current (screen plus plate current). Under such conditions, the plate current is substantially independent of the plate-cathode voltage. Also, the screen grid, control grid and cathode of a pentode operate as a miniature triode whose plate is the screen grid.

Since its plate current is relatively independent of its plate voltage, the tube 56, together with the batteries 52 and 54, acts as a substantially constant current source maintaining a constant cathode current through the tube 48. Therefore, the screen current in the tube 48 also remains substantially constant in spite of variations in the voltage of the control grid 48a. The screen-cathode voltage of the tube 48 is also maintained constant by the battery 50. Therefore, viewing the triode comprising the cathode, control grid and screen grid of the tube 48, the voltage between the grid 48a and the cathode 48c must also be constant. Hence, the voltage at the cathode 48c exactly follows the voltage at the grid 48a. In practice, the correspondence between the cathode and control grid voltages has been found to be 0.999— as compared with 0.96 in an ordinary cathode follower stage.

The electrometer input tube 42 provides a high input impedance on the order of $10^{14}$ ohms while retaining the essentially unity voltage gain of the second stage of the amplifier. The voltage at the cathode 42c would, without the connections to the tube 48, register the gain of a cathode follower stage, which is significantly less than unity. However, in the circuit of FIGURE 2, the connection between the cathode 42c and grid 48a causes the cathode 48c to shift in voltage by the same amount as the shift in the voltage at the cathode 42c resulting from a change in the voltage at the grid 42a. This causes a change in the voltage of the screen 42d in the same direction as the change in the input voltage of the amplifier 24 and thereby further increases the correspondence between the cathode and grid voltages of the tube 42. This causes a further change in the voltage at the cathode 48c, providing in effect a bootstrap action which culminates in a net change in the voltage of the cathode 48c equal to the change in the voltage of the grid 42a.

The offset provided by the tap on the battery 46 makes the level of output voltage of the amplifier 24 equal to its input level at the grid 42a, so that both the level of the output voltage and increments therein are the same as the voltage on the plate 14 and lead 16 applied to the grid 42a.

The tube 42 may be a type 5889 electrometer and the tubes 48 and 56 type 1L4 pentodes. With these tubes, the following values for the various elements in the amplifier 24 may be used:

| | | |
|---|---|---|
| R3 | megohms | 2.4 |
| R4 | ohms | 2600 |
| Battery 50 | volts | 90 |
| Battery 52 | do | 90 |
| Battery 54 | do | 90 |
| Battery 44 | do | 7.5 |
| Battery 46 | do | 13.5 |

The load applied to the terminals 38 and 40 may be as low as 400,000 ohms without seriously affecting the operation of the amplifier 24.

The output of the amplifier 24 is connected to the inner shield 18 by way of the contact 30a and relay arm 30, and this shield is thereby maintained at almost exactly the same potential as the plate 14 and lead 16 of the probe 10. This eliminates, for all practical purposes, stray capacitance between the probe and the object 12. The use of a cathode follower amplifier instead of the unity gain amplifier 24 would leave 5 percent or more of the capacitance between the plate 14 and lead 16 and the inner shield 18. Such a residual capacitance will prevent proper operation of the instrument.

Still referring to FIGURE 2, the capacitance $C_o$ is charged to a predetermined charge level in a manner presently to be described. The amount of charge is independent of the value of this capacitance, i.e., independent of the distance between the plate 14 and the object 12. Accordingly, the voltmeter 26 connected to the output of the amplifier 24 indicates the amplitude of the vibrations of the object 12 regardless of the spacing between the object and the probe 10, as demonstrated above.

More specifically, with the relay arms 30 and 32 in the positions shown in FIGURE 2, the constant charge mechanism is inoperative, and the instrument is connected to measure vibration amplitudes. Over a period of time, the charge on the capacitor $C_o$ diminishes because of leakage through the atmosphere as well as the insulating material (not shown) between the shield 18 and the plate 14 and lead 16. A conductive path between the shield 18 and the object 12 is maintained by way of the resistor R1 connected between the outer shield 20 and the relay arm 32. Even though the capacitance $C_o$ is quite small, of the order of a few micro-microfarads, the time required for appreciable discharge thereof is fairly long. The leakage path through the insulation to the shield 18 has a high resistance, and the potential of the shield 18 is almost exactly equal to that of the plate 14. Therefore, leakage current through this path is extremely small. Accordingly, leakage of charge takes place almost entirely through the atmosphere. Preferably, the charging mechanism is set to recharge the probe-object capacitance periodically before appreciable loss of charge has taken place.

The periodic recharging of the capacitance $C_o$ is accomplished as follows. As seen in FIGURE 2, a pulse from the pulse source 34 energizes the relay coil 28 and thereby moves the arms 30 and 32 to the contacts 30b and 32b. The capacitor $C_o$ is thus discharged to the outer shield 20 by way of the resistor R1 which has a relatively small resistance of 1 megohm. At the same time, the capacitor $C_1$, comprising the shield 18 and the plate 14 and lead 16, is charged to the voltage of the battery 36. This operation takes a relatively short time, and upon cessation of the energizing pulse applied to the coil 28, the relay arm moves back to the contacts 30a and 32a.

This places the capacitor $C_1$ in series with the capacitor $C_o$ and the output terminals 38 and 40 of the amplifier 24, as illustrated in FIGURE 2. The capacitor $C_o$ is connected across the input of the amplifier. The amplifier requires its input and output voltages to be the same, and therefore it forces the voltage across the capacitor $C_o$ to drop to zero by making th epotential of the shield 18 equal to that of the lead 16. In other words, the charge on the capacitor $C_1$ is removed. Since there are no dissipative elements in parallel with the capacitor $C_1$, this charge must be transported to the capacitor $C_o$.

Thus, the amplifier 24 pumps the charge from the capacitor $C_1$ to the capacitor $C_o$, and since the capacitance $C_1$ and the voltage of the battery 36 are fixed, the charge on this capacitance transferred to the capacitance $C_o$ is also fixed and is independent of the value of the latter capacitance. For vibration measurements, the amount of the fixed charge need not be known in order to calibrate the instrument. The probe may be positioned at two successive known distances from a non-vibrating metallic object and the direct voltage corresponding to those distances measured across the terminals 38 and 40. The difference between the two measured voltages divided by the difference between the two distances is the ratio of the peak amplitude of the alternating current signal to the vibrational amplitude of the object 12 measured by the instrument.

Alternatively, the instrument may be calibrated by calculation on the basis of the area of the plate 14 and measured value of the capacitance $C_1$.

The operation of the constant charge mechanism will be understood by reference to FIGURE 3 which is a simplified schematic diagram of the elements associated with the charging operation. As shown therein, when the relay arms 30 and 32 are in the "b" positions, the capacitor $C_o$ is discharged, and the capacitor $C_1$ is charged as described above. When the arms return to the "a" or operating positions, the capacitors $C_o$ and $C_1$ are in series with the output of the amplifier 24. Initially, in this position there is no voltage across the capacitor $C_o$, and therefore the voltage across the amplifier output terminals 38 and 40 is also zero. However, the capacitor $C_1$ commences to discharge through the amplifier output into the capacitor $C_o$. As it does so, a voltage appears across the terminals 38 and 40 which aids discharge of the capacitor $C_1$. The amplifier output voltage increases with the charge on the capacitor $C_o$. Finally, when the output voltage equals the voltage across the capacitor $C_o$, the sum of the two voltages is zero, and this is the potential across the capacitor $C_1$. The charge on the latter capacitance must therefore be zero. Since there is essentially no conductive path across the capacitor $C_1$, the charge on this capacitor can only have been transferred to the capacitor $C_o$.

It will be noted that, since the charge on the capacitor $C_o$ after the transfer process is equal to the charge on the capacitor $C_1$ prior to transfer, the ratio of the voltages on the two capacitors will be inversely proportional to the respective capacitances. Therefore, if the value of $C_1$ and the voltage of the battery 36 are known, the voltage across the capacitor $C_o$, measured at the terminals 38 and 40, indicates the capacitance of this capacitor. The circuit of FIGURE 2 may thus be used as a highly accurate capacitance meter capable of measuring very small capacitances.

Still referring to FIGURE 3, another way in which a capacitance may be measured by the circuit of FIGURE 2 is by using the known capacitor in the position of the capacitor $C_o$ and the unknown in the position of the capacitor $C_1$. Again, the ratios of the voltages will determine the unknown capacitance. If the unknown capacitance $C_1$ is much smaller than $C_o$, the resistor R1 may be disconnected and the relay arms 30 and 32 cycled for a known number of cycles. The capacitor $C_1$ will then be charged a number of times, and each time it will be discharged into the capacitor $C_o$. The capacitor $C_o$ will not be discharged during each cycle because of the absence of the resistor R1. The cumulative charge buildup on the capacitor $C_o$ will provide an easily measured voltage across this capacitor, reproduced at the output terminals 38 and 40.

The time required to discharge the capacitor $C_o$ through the resistor R1 and charge the capacitor $C_1$ is on the order of a few microseconds, and therefore the operating pulses from the pulse source 34 may be very short in duration, since inertia and over-travel in the relay will maintain the arms 30 and 32 in the "$b$" positions for a sufficiently long period. The repetition rate of the pulses determines the time interval between the periodic recharging of the capacitor $C_o$. As long as the measuring portion of each cycle of the relay arms 30 and 32 (the "$a$" positions of the arms) is substantially greater than the charging portion (the "$b$" positions), the relationship of the pulse repetition rate to the frequency of vibration will not be critical. The vibration frequency may be greater, less, or the same as the pulse rate.

On the other hand, if the pulse rate is great enough so that the arms 30 and 32 are in the "$b$" positions for an appreciable portion of each cycle, it should differ substantially from the vibration frequency. This will minimize errors resulting from variations in the relative timing of the vibration cycles and the measuring intervals of the relay arm cycles by averaging each measuring interval over a large number of vibration cycles or averaging a large number of measuring intervals over each vibration cycle. The actual averaging process may be accomplished by the meter 26 itself in a well-known manner.

In FIGURE 4, I have illustrated an alternating-current version of my vibration measuring instrument. The constant charge source 22 includes an alternating current generator 64 connected in series with a high impedance 66 across the probe-vibrating object capacitor $C_o$. The impedance 66 which may, by way of example, be a single capacitor having a relatively low capacitance, is much greater than the impedance of the capacitance $C_o$ at the frequency of the generator 64. Hence, the output current of the generator 64, passing through the impedance 66 and the capacitor $C_o$, is essentially independent of variations in the capacitance of the latter for values of capacitance above a lower limit corresponding to a maximum distance between the probe 10 and object 12. In other words, as long as the distance between the probe and the object 12 is less than a given amount corresponding, for example, to an impedance of the capacitor $C_o$ less than one tenth of the impedance 66, the current through the capacitor $C_o$ from the generator 64 may be regarded as independent of the probe-object spacing. Thus, the constant charge source is also an A.-C. constant current source. Other A.-C. constant current sources than the one specifically illustrated may be used.

The generator 64 may comprise an oscillator, amplifier and output transformer adapted to supply a high output voltage so that the voltage across the capacitor $C_o$, i.e., the voltage between the plate 14 and ground, applied to the input of the unity gain amplifier 24, is easily measured.

The operation of the alternating-current probe of FIGURE 4 may be derived as follows. Assuming a sinusoidal voltage from the generator 64, the charge $q$ on the capacitor $C_o$, which is the time integral of the current, is also sinusoidal and may be represented by, $$q = q_0 \cos(\varphi t) \qquad (8)$$

where $q_0$ is a constant.
From (6), $$x = x_0 + \Delta x = x_0 + M \cos(\omega t) \qquad (9)$$

where $x_0$ is the distance between the plate 14 and object 12 about which the object vibrates. Similarly, $$V = V_0 + \Delta V \qquad (10)$$

where V is the voltage corresponding to the distance $x_0$. Accordingly, from (7), $$V = \frac{qx_0}{kA} + \frac{qM}{kA} \cos(\omega t) \qquad (11)$$

and by substituting (8) into (11), $$V = \frac{q_0 x_0}{kA} \cos(\varphi t) + \frac{q_0 M}{kA} \cos(\omega t) \cos(\varphi t) \qquad (12)$$

If the angular frequency $\varphi$ is greater than $\omega$, Equation 12 describes an amplitude modulated signal with an angular carrier frequency $\varphi$ and angular modulation frequency $\omega$. The amplitude of the modulation component of the signal is proportional to the amplitude of vibration and independent of the distance $x_0$. Accordingly, the meter 26 in FIGURE 4 should be preceded by a demodulator 68 which may be of any conventional type, such as a rectifier followed by a low pass filter, whose output voltage is proportional to the amplitude of the modulation on the carrier. The voltage indication registered by the meter 26 is then a direct measure of the amplitude of the vibrations of the object 12.

In the alternating-current probe, the amplifier 24 does not require the extremely high input resistance provided by the electrometer tube 42. Therefore, this stage may be removed from the amplifier and the lead 16 connected directly to the control grid 48a. The amplifier 24 will still retain its unity gain characteristic.

In practice, the frequencies $\omega$ and $\varphi$ should differ substantially from each other. If they are close together, it may be difficult to separate the amplitudes of the carrier and modulating signal. However, theoretically $\omega$ and $\varphi$ may be as close as desired as long as a suitable detector is provided.

The similarities between the direct- and alternating-current versions of my invention, as illustrated in FIGURES 2 and 4, will now be apparent. In each case, a constant charge source charges the probe-vibrating object capacitance to a charge level independent of the spacing between the probe and the object. The stray capacitance between the probe 10 and the object by way of ground connections and other paths is entirely eliminated by the use of feedback from a unity voltage gain amplifier to an inner shield surrounding the plate 14 and lead 16 of the probe. In this manner, I obtain a linear relationship between the output voltage and distance between the probe 10 and the vibrating object 12. Therefore, the alternating-current output voltage from the instrument, as indicated by the meter 26, is directly proportional to the vibrational amplitude and independent of the distance between the probe and object. This distance, therefore, need not be measured or taken into account in computing the amplitude of vibration. In fact, the probe may be held in one's hand, and the variations in distance incurred in this manner will not affect the readings taken with the instrument.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

I claim:

1. In an instrument adapted to measure the amplitude of vibration of an object, the combination of a capacitance probe, means charging the capacitor comprising said probe and said object with a charge independent of the capacitance of said capacitor, means eliminating stray capacitance between said probe and object, and means measuring the voltage between said object and said probe, said charging means comprising a substantially constant current alternating-current source connected across said capacitor.

2. In an instrument adapted to measure the amplitude of vibration of an object, the combination of a capacitance probe, means charging the capacitor comprising said probe and said object with a charge independent of the capacitance of said capacitor, means eliminating stray capacitance between said probe and object, and means measuring the voltage between said object and said probe, said charging means including a second capacitor, means for charging said second capacitor to a given voltage, and means for periodically transferring the charge on said second capacitor to said capacitor comprising said probe and object.

3. In an instrument adapted to measure the amplitude of vibration of an object, the combination of a probe, said probe including an exposed conductor having an exposed portion facing said object and forming a capacitor therewith, an electrostatic shield surrounding the remaining portions of said probe, means charging the capacitor comprising said exposed portion and said object with a charge independent of the capacitance of said capacitor, means measuring the voltage between said object and said exposed conductor, and means comprising a unity voltage gain amplifier whose input is connected to said conductor and said object and whose output is connected between said shield and said object, thereby to eliminate capacitance between said conductor and said shield, said charging means including a substantially constant current alternating-current source whose output is connected across said capacitor, whereby the current from said source through said capacitor is substantially independent of the spacing between said object and said exposed portion of said conductor over the range of use of said probe.

4. The combination defined in claim 3 in which the frequency of said source is substantially different from the frequency of vibration of said object.

5. In an instrument adapted to measure the amplitude of vibration of an object, the combination of a probe, said probe including an exposed conductor having an exposed portion facing said object and forming a capacitor therewith, an electrostatic shield surrounding the remaining portions of said probe, means charging the capacitor comprising said exposed portion and said object with a charge independent of the capacitance of said capacitor, means measuring the voltage between said object and said exposed conductor, and a unity voltage gain amplifier whose input is connected to said conductor and said object and whose output is connected between said shield and said object, thereby to eliminate capacitance between said conductor and said shield, said charging means comprising a second capacitor, means for applying a fixed voltage to said second capacitor, and means for periodically transferring the charge on said second capacitor to said capacitor comprising said object and exposed portion of said conductor.

6. The combination defined in claim 5 in which said second capacitor includes the capacitor formed by said conductor and said shield.

7. An instrument adapted to measure the vibrational amplitude of an object, said instrument comprising a probe including a conductor having a flat exposed portion and an electrostatic shield around the remaining portions of said conductor, a unity voltage gain amplifier having a pair of input terminals and a pair of output terminals, said input terminals being connected to said conductor and said vibrating object, said output terminals being connected to said object and said shield, thereby to maintain said shield at the potential of said conductor and eliminate all capacitance between said conductor and said object except by way of said exposed portion of said conductor, a source of unidirectional constant electrical potential, switching means having first and second positions, said switching means connecting a first one of said output terminals to said shield in said first position thereby to maintain said shield at the potential of said conductor, said switching means disconnecting said shield from said first output terminal in said second position and connecting said source of potential between said shield and said conductor thereby to charge a first capacitor comprising said conductor and shield to the potential of said source, said switching means also providing a conducting path between said conductor and said object when in its second position, thereby to discharge a second capacitor comprising said conductor and said object, said conducting path having a substantially lower resistance than the leakage resistance between said conductor and said object, whereby when said switching means returns from said second position to said first position said amplifier causes a transfer of the charge on said first capacitor to said second capacitor, the discharge time of said second capacitor through said leakage resistance being substantially different from the period of vibration of said object and voltage-responsive means connected across said output terminals.

8. The combination defined in claim 7 including means for periodically cycling said switching means over intervals substantially longer than the period of vibration of said object and substantially less than the discharge time of said second capacitor through said leakage resistance.

9. The combination defined in claim 8 in which said cycling means maintains said switching means in said second position for a substantially shorter interval than in said first position.

10. The combination defined in claim 7 including a guard ring disposed around and in the plane of said exposed portion of said conductor, said guard ring being connected to said shield.

11. In an instrument adapted to measure the amplitude of vibration of an object, the combination of a capacitance probe, said probe including a conductor having an exposed portion facing said object and forming a capacitor therewith when disposed in the vicinity thereof, an electrostatic shield surrounding the remaining portions of said probe, means for charging the capacitor comprising said exposed portion and said object with a charge substantially independent of the capacitance of said capacitor, and a unity voltage gain amplifier having a pair of input terminals connected to said conductor and said object and a pair of output terminals connected to said shield and said object, thereby to eliminate capacitance between said conductor and said shield, said amplifier comprising an input tube including a cathode, control grid, screen grid and plate, said input tube being connected in a cathode follower circuit, an output tube, said output tube being a pentode having a cathode, control grid, screen grid and plate, plate supply means for said input and output tubes, said cathode of said input tube being connected to said control grid of said output tube, said screen grid of said input tube being connected to said cathode of said output tube, means maintaining said grid screen of said output tube at a fixed potential with respect to said cathode thereof, said output tube being connected in a cathode follower circuit with a cathode resistor having a high dynamic impedance, means returning said cathodes of said first and second tubes to a common point, said control grid of said first tube and said common point comprising said input terminals of said amplifier and said cathode of said second tube and said common point comprising said output terminals thereof.

References Cited in the file of this patent

UNITED STATES PATENTS

| | | |
|---|---|---|
| 2,507,324 | Taborsky | May 9, 1950 |
| 2,599,528 | Beveridge | June 10, 1952 |
| 2,623,996 | Gray | Dec. 30, 1952 |
| 2,661,622 | Severs | Dec. 8, 1953 |
| 2,764,020 | Gadd | Sept. 25, 1956 |
| 2,802,178 | Shafer et al. | Aug. 6, 1957 |